United States Patent
Fedorova et al.

(10) Patent No.: US 7,818,747 B1
(45) Date of Patent: Oct. 19, 2010

(54) CACHE-AWARE SCHEDULING FOR A CHIP MULTITHREADING PROCESSOR

(75) Inventors: Alexandra Fedorova, Lincoln, MA (US); Christopher A. Small, Cambridge, MA (US)

(73) Assignee: Oracle America, Inc., Redwood City, CA (US)

( * ) Notice: Subject to any disclaimer, the term of this patent is extended or adjusted under 35 U.S.C. 154(b) by 1385 days.

(21) Appl. No.: 11/265,814

(22) Filed: Nov. 3, 2005

(51) Int. Cl.
G06F 9/46 (2006.01)
G06F 12/00 (2006.01)
G06F 13/00 (2006.01)
G06F 13/28 (2006.01)

(52) U.S. Cl. .................... 718/102; 718/107; 711/1; 711/113; 711/118; 711/147; 711/170

(58) Field of Classification Search .............. 711/1, 711/113–173; 718/102, 107
See application file for complete search history.

(56) References Cited

U.S. PATENT DOCUMENTS

| | | | | |
|---|---|---|---|---|
| 5,724,586 A * | 3/1998 | Edler et al. | ................. | 718/102 |
| 5,761,715 A * | 6/1998 | Takahashi | ................. | 711/128 |
| 6,049,867 A * | 4/2000 | Eickemeyer et al. | ........ | 712/228 |
| 6,243,788 B1 * | 6/2001 | Franke et al. | ................. | 711/3 |
| 6,341,347 B1 * | 1/2002 | Joy et al. | ................. | 712/228 |
| 6,381,676 B2 * | 4/2002 | Aglietti et al. | ............. | 711/133 |
| 6,578,065 B1 * | 6/2003 | Aglietti et al. | ............. | 718/104 |
| 6,681,297 B2 * | 1/2004 | Chauvel et al. | ............. | 711/130 |
| 6,845,501 B2 * | 1/2005 | Thompson et al. | ........ | 717/140 |
| 7,284,093 B2 * | 10/2007 | Presler-Marshall | ........ | 711/126 |
| 7,310,705 B2 * | 12/2007 | Yoshida et al. | ............. | 711/122 |
| 7,353,445 B1 * | 4/2008 | Barreh et al. | ............... | 714/758 |
| 7,383,403 B1 * | 6/2008 | Barreh et al. | ............... | 711/156 |
| 7,401,188 B2 * | 7/2008 | Matthews | ................... | 711/138 |
| 7,434,000 B1 * | 10/2008 | Barreh et al. | ............... | 711/118 |
| 7,509,484 B1 * | 3/2009 | Golla et al. | ................. | 712/225 |
| 2004/0243765 A1 * | 12/2004 | Lee | ........................... | 711/118 |
| 2005/0071564 A1 * | 3/2005 | Luick | ......................... | 711/121 |
| 2006/0026594 A1 * | 2/2006 | Yoshida et al. | ............. | 718/100 |
| 2009/0222625 A1 * | 9/2009 | Ghosh et al. | ............... | 711/130 |

* cited by examiner

*Primary Examiner*—Meng-Ai An
*Assistant Examiner*—Adam Lee
(74) *Attorney, Agent, or Firm*—Osha • Liang LLP

(57) ABSTRACT

A chip multithreading processor schedules and assigns threads to its processing cores dependent on estimated miss rates in a shared cache memory of the threads. A cache miss rate of a thread is estimated by measuring cache miss rates of one or more groups of executing threads, where at least one of the groups includes the thread of interest. Using a determined estimated cache miss rate of the thread, the thread is scheduled with other threads to achieve a relatively low cache miss rate in the shared cache memory.

7 Claims, 12 Drawing Sheets

CACHE-AWARE SCHEDULING FOR A CHIP MULTITHREADING PROCESSOR

BACKGROUND

In a typical computer network, a server computer 10 services requests from and provides data to client computers 12, 14, 16, 18 that are connected to the server computer 10 over a network (e.g., the Internet) 20. The server computer 10 may be used to store data, programs, etc. for use by the client computers 12, 14, 16, 18. Those skilled in the art will recognize that the server computers 10 may also be used to manage and control the client computers 12, 14, 16, 18.

In one example, an internet-based business may operate a server (or servers) to handle customer requests initiated at computer terminals located potentially thousands of miles away from the business's server(s). Each time a customer accesses the website of the business, an independent set of software instructions, i.e., a "thread," is executed by a processor of the business's server(s) to provide requested data to the customer.

In order to better meet increased networking demands, the "server" side of the client-server model shown in FIG. 1 may be implemented using any one of a variety of designs. For example, in FIG. 2, a server side of a computer network is implemented using server 30, 32 that each having a single processor 34, 36, respectively. Each single processor 34, 36 is capable of executing one thread at a time. Thus, the server side in FIG. 2 is capable of executing two threads at a time for the client computers 38, 40, 42, 44 connected to the servers 30, 32 over network 46. If a third thread is initiated while each of the processors 34, 36 is executing a thread, one of the threads being executed by the processors 34, 36 may be blocked in order to allow the third thread to be executed (dependent on, for example, priority of the third thread). Alternatively, the third thread may be forced to wait until one of the processors 34, 36 completes executing its respective thread.

In another type of design, for example, as shown in FIG. 3, a server side of a computer network is implemented using a server 50 that has a multithreaded processor 52. The multithreaded processor 52 is capable of executing a plurality of threads. Thus, if the multithreaded processor 52 supports the execution of x threads at a time, x threads may be executed at a time for the client computers 54, 56, 58, 60 connected to the server 50 over network 62. When a thread being executed by the multithreaded processor 52 stalls due to, for example, waiting for data from memory, another thread may be picked up and executed by the multithreaded processor 52.

In another type of design, for example, as shown in FIG. 4, a server side of a computer network is implemented using a multiprocessor server 70. The multiprocessor server 70 has a plurality of processors 72, 74, 76, 78 that are each capable of executing one thread at a time. Thus, in FIG. 4, the multiprocessor server 70 is capable of executing four threads in parallel for the client computers 80, 82, 84, 86 connected to the multiprocessor server 70 over network 88. Those skilled in the art will recognize that a symmetric multiprocessing (SMP) system is a type of multiprocessing system in which multiple threads may be executed in parallel. Although typical SMP processors only process one thread at a time, the greater number of processors in the SMP system relative to that of a non-multiprocessing system increases the number of threads that are executable in a given period of time.

In another type of design, for example, as shown in FIG. 5, a server side of a computer network is implemented using a multiprocessor server 90 that has a plurality of multithreaded processors 92, 94, 96, 98. Thus, if each of the multithreaded processors 92, 94, 96, 98 is capable of executing x threads at a time, the multiprocessor server 90 is capable of executing 4x threads at a given time for the client computers 100, 102, 104, 106 connected to the multiprocessor server 90 over network 108.

The execution of a software thread in any one of the types of processors described above with reference to FIGS. 2-5 occurs in a part of the processor known as the "core" (referred to and known in the art as "processing core"). The processing core is formed of a hardware execution pipeline and functional units (e.g., arithmetic units and load/store units) that actually perform the execution of a software thread.

In the case of a multithreaded processor as described above with reference to FIGS. 3 and 5, a scheduler, typically part of the operating system, selectively assigns multiple threads to a processing core of the multithreaded processor. Such a multithreaded processing core interleaves execution of instructions from multiple threads, potentially switching between contexts (i.e., switching between threads) on each cycle. A thread may become blocked when the thread encounters a long-latency operation, such as, for example, servicing a cache memory miss. When one or more threads are unavailable, the multithreaded processing core continues to switch among the remaining available threads. Those skilled in the art will recognize that for multithreaded workloads, such multithreading improves processor utilization and hides the latency of long operations.

SUMMARY

According to one aspect of one or more embodiments of the present invention, a method of performing computer system operations comprises: determining a shared cache miss rate of a thread; comparing the shared cache miss rate with a maximum shared cache miss rate of a first hardware context associated with one of a plurality of processing cores in a chip multithreading processor; and assigning the thread to the first hardware context dependent on the comparing.

According to another aspect of one or more embodiments of the present invention, an apparatus comprises: a plurality of processing cores, each having a plurality of hardware contexts for processing multiple threads; and a cache memory shared by the plurality of processing cores, where a thread is assigned to a first of the plurality of hardware contexts dependent on a shared cache miss rate of the thread and a maximum shared cache miss rate associated with the first hardware context.

According to another aspect of one or more embodiments of the present invention, a computer system comprises: an integrated circuit having a plurality of processing cores formed therein; a cache memory shared by the plurality of processing cores; and memory having instructions for assigning a first of a plurality of threads to a first hardware context of one of the plurality of processing cores, where the instructions comprise instructions to (i) determine a shared cache miss rate of the first thread, (ii) compare the shared cache miss rate with a maximum shared cache miss rate associated with the first hardware context, and (iii) assign the first thread to the first hardware context dependent on the comparison.

Other aspects and advantages of the invention will be apparent from the following description and the appended claims.

DETAILED DESCRIPTION

Figure 1:
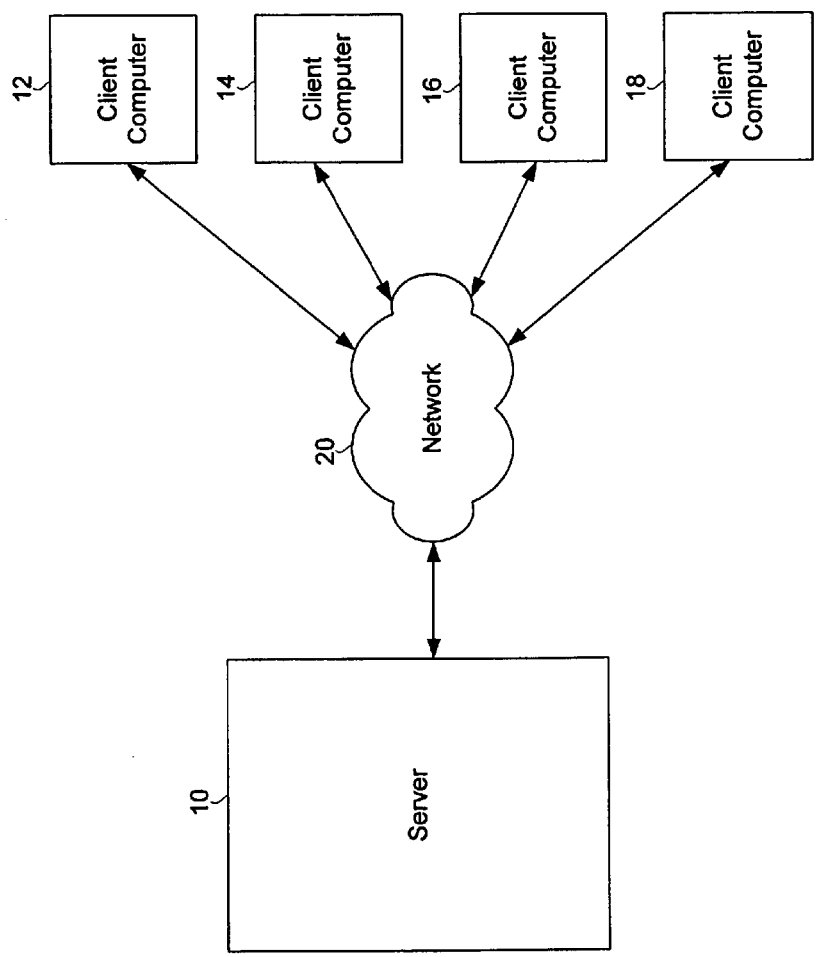
FIG. 1 shows a computer network.
Figure 2:
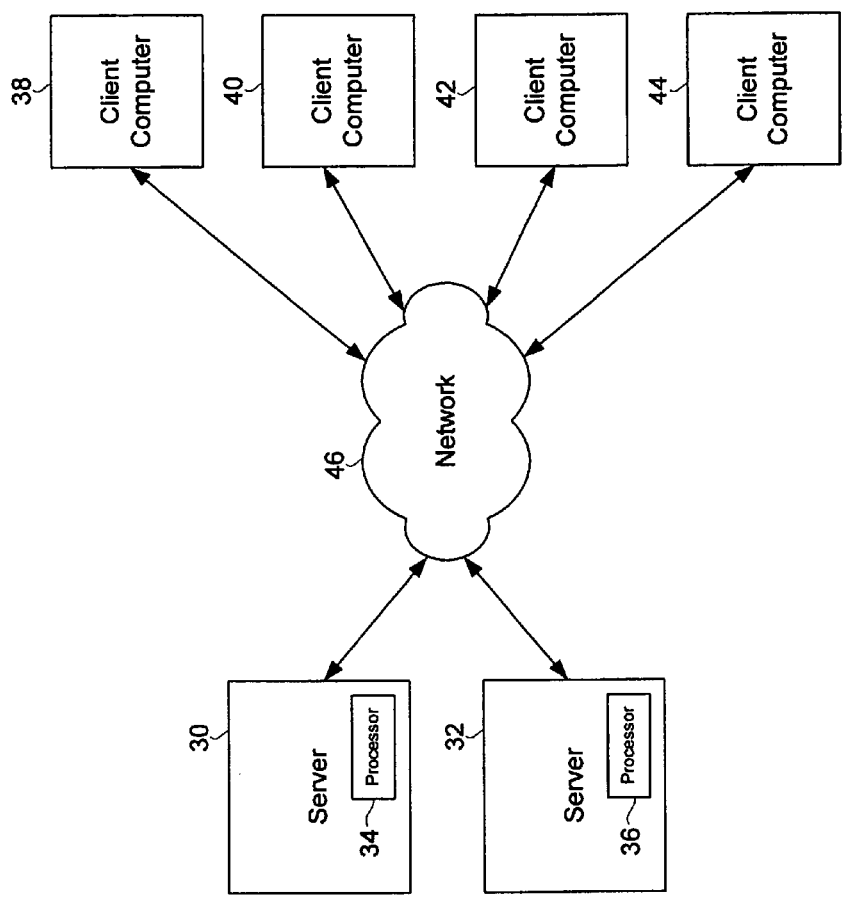
FIG. 2 shows a type of computer network.
Figure 3:
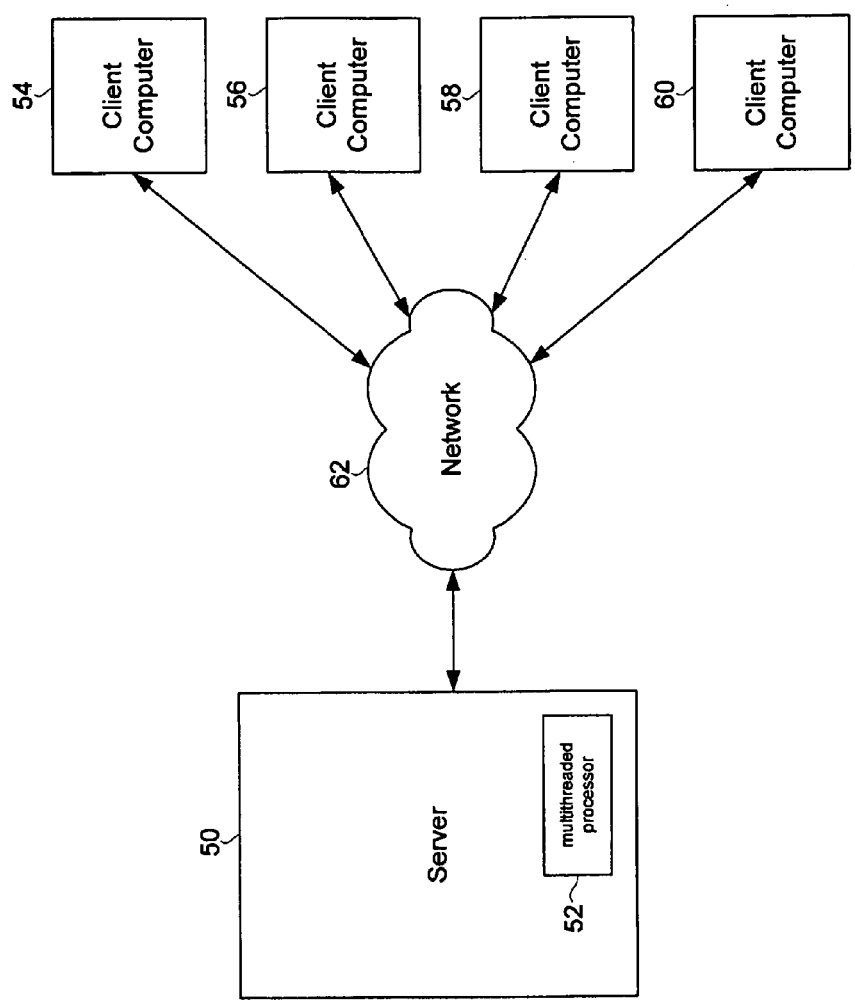
FIG. 3 shows a type of computer network.
Figure 4:
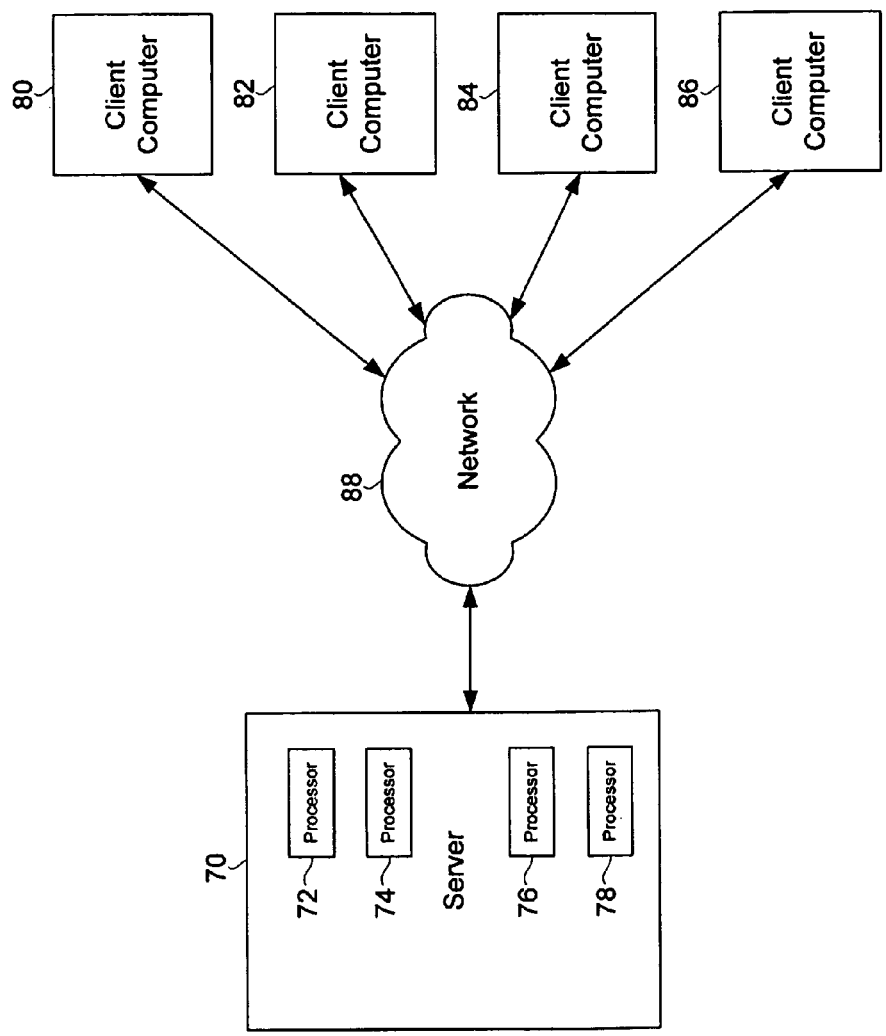
FIG. 4 shows a type of computer network.
Figure 5:
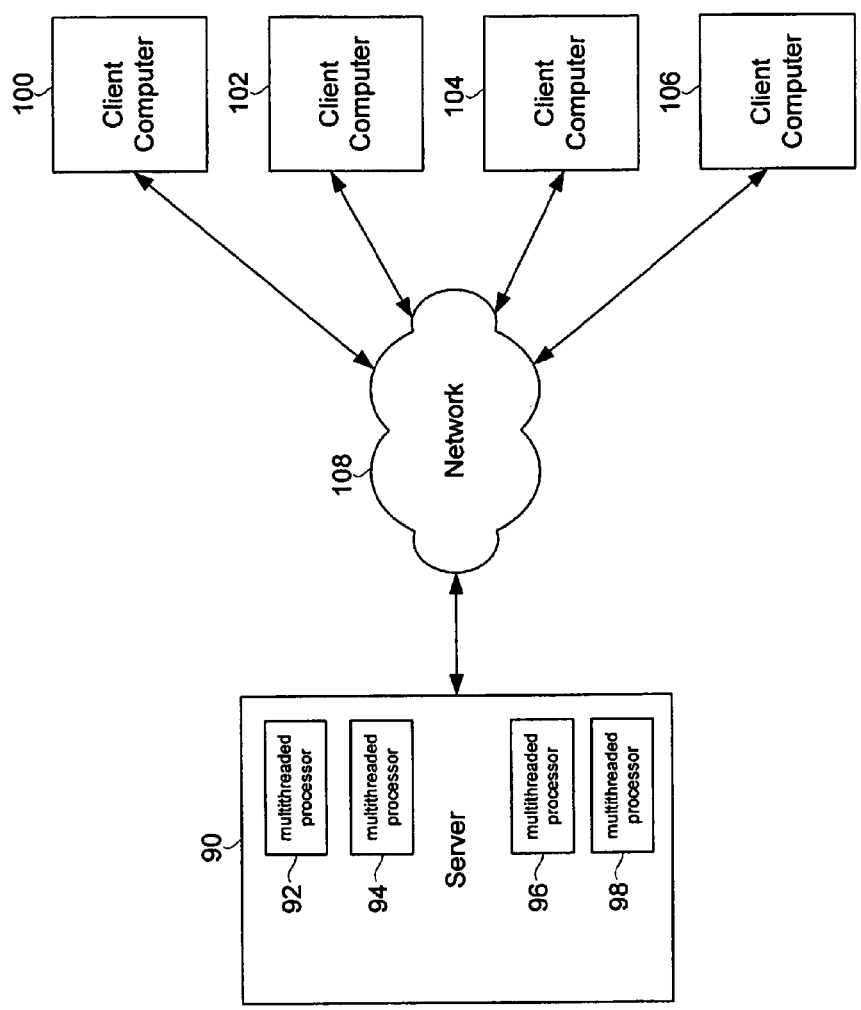
FIG. 5 shows a type of computer network.
Figure 6:
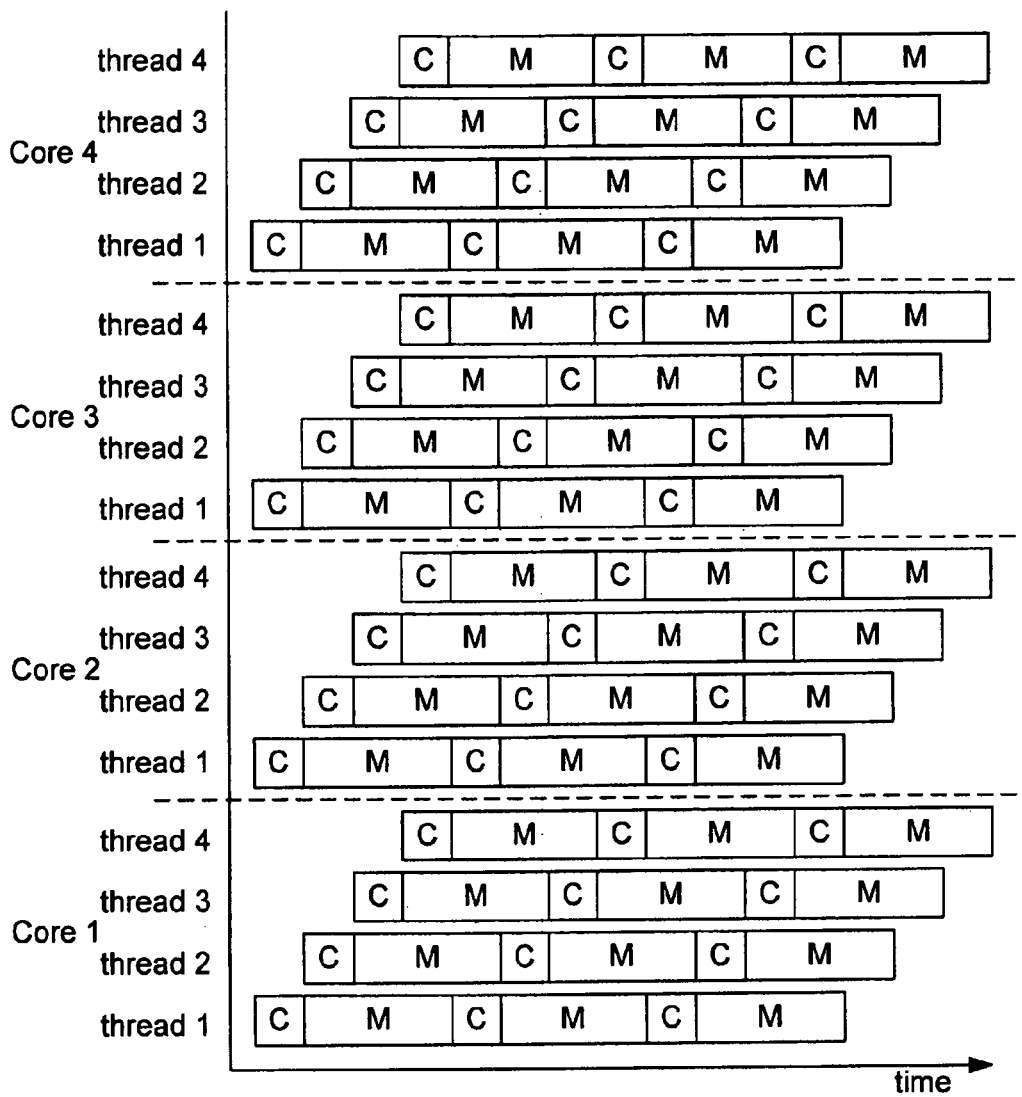
FIG. 6 shows a representation of thread execution in a chip multithreading processor.
Figure 7:
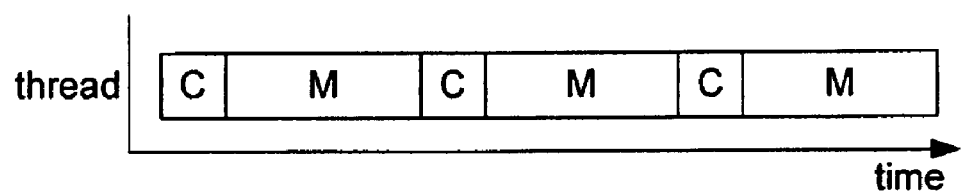
FIG. 7 shows a representation of thread execution in a single-threaded processor.
Figure 8:
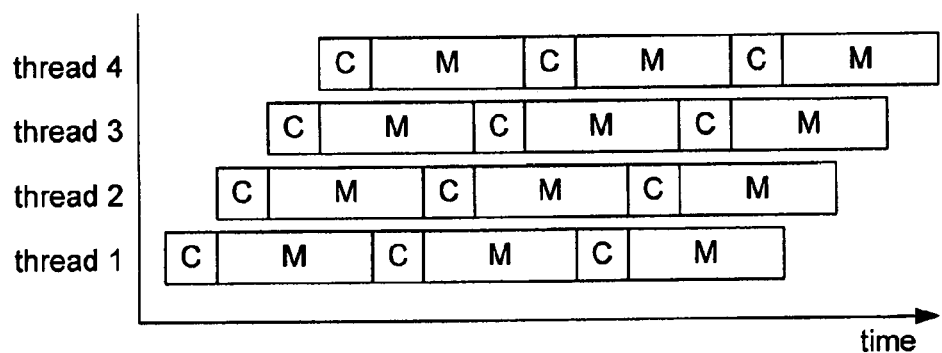
FIG. 8 shows a representation of thread execution in a processor having a single multithreaded processing core.

An exemplary processor in accordance with one or more embodiments of the present invention is formed of a plurality of processing cores, each being configured to execute multiple threads. More particularly, each of the plurality of processing cores has multiple hardware contexts, where a thread may be scheduled on each hardware context. Such a processor is referred to as a "chip multithreading" processor (or, referred to in the art as being capable of performing "throughput computing"). Thus, a chip multithreading processor has multiple processing cores fabricated on a single piece of silicon, where each processing core is configured to execute multiple threads as shown in FIG. 6 (showing the processing of 16 threads by a single chip multithreading processor versus (i) the processing of one thread in a single-threaded processor as shown in FIG. 7 and (ii) the processing of multiple threads in a processor having a single multithreaded processing core as shown in FIG. 8, where C represents a computing event and M represents a "waiting-on-memory" event).

Those skilled in the art will note that memory speeds have been increasing at a slower rate than processor speeds. Thus, typical processors may be stalled for relatively long times as they wait for data from memory. In a chip multithreading processor, when a thread must wait for a response from memory, the corresponding processing core may start processing another thread. Those skilled in the art will further note that such chip multithreading processors may be useful in thread-rich networking environments.

One factor to be considered in the design of a processor having multiple hardware contexts, such as with a chip multithreading processor, is operating system scheduling. Although a scheduling technique or scheduler design for a processor having a single multithreaded processing core may be applied to assign threads in a chip multithreading processor, one or more embodiments of the present invention relate to an improved scheduling technique (or scheduler) for assigning threads for use of shared hardware resources in a chip multithreading processor.

Figure 9:
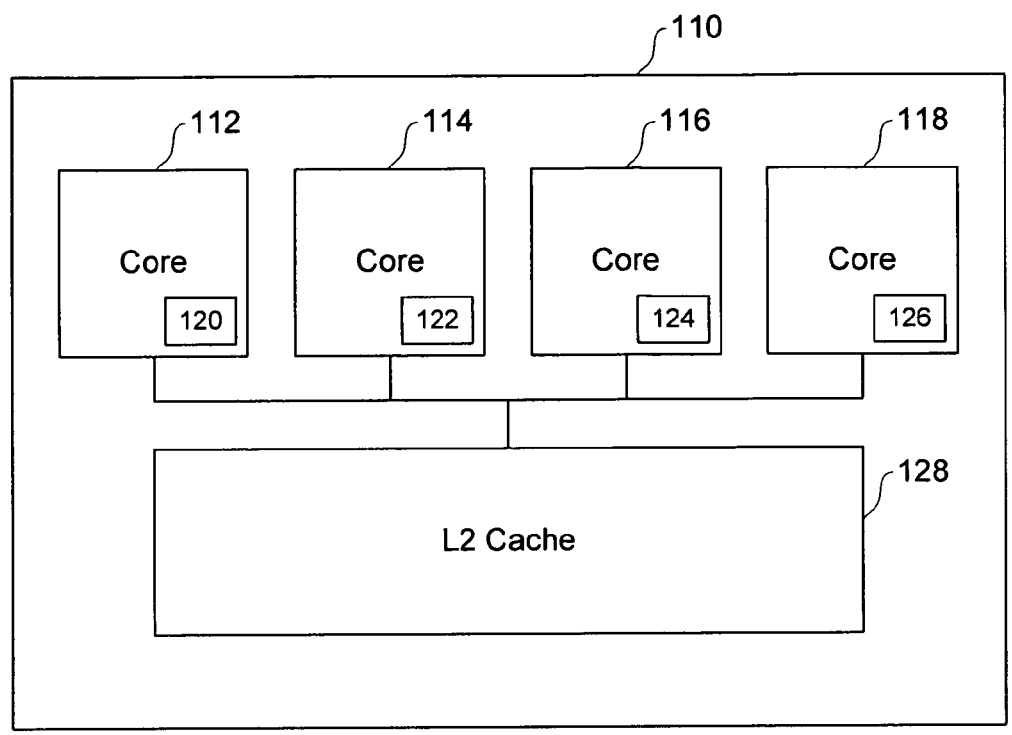
FIG. 9 shows a chip multithreading processor in accordance with an embodiment of the present invention.

FIG. 9 shows an exemplary chip multithreading processor 110 in accordance with an embodiment of the present invention. The chip multithreading processor 110 has processing cores 112, 114, 116, 118, each having multiple hardware contexts for executing multiple threads as described above. Each processing core 112, 114, 116, 118 has its own local, level 1 ("L1") cache 120, 122, 124, 126, respectively. Further, the chip multithreading processor 110 has a level 2 ("L2") cache 128 that is shared among the processing cores 112, 114, 116, 118.

Because the L2 cache 128 is a shared resource in the chip multithreading processor 110, it is important to schedule threads for use of the L2 cache 128 in a manner that results in improved management of the L2 cache 128. In one or more embodiments of the present invention, an operating system scheduler (not shown) assigns threads based on a determination of which threads collectively achieve a relatively low L2 cache miss rate when run in parallel.

Estimating L2 Cache Miss Rates

In order to assign a group of threads that together achieve a relatively low L2 cache miss rate in a chip multithreading processor, an L2 cache miss rate of each thread in the group is determined. This is achieved by observing/measuring the L2 cache miss rates of executing groups of threads. By recognizing that an observed/measured L2 cache miss rate for an executing group of threads may be expressed as a linear combination of the L2 cache miss rates of the individual threads in the group, one skilled in the art will note that a system of linear equations for one or more executing groups of threads may be used to determine the L2 cache miss rates of individual threads in the one or more executing groups of threads.

Those skilled in the art will note that the use and solving of a system of linear equations as described above may only or mainly be necessary upon system startup when the L2 cache miss rates of individual threads may be largely unknown as they have not yet become part of or are just starting execution in an executing group of threads. Further, in one or more embodiments, an operating system scheduler may give priority to threads that are not yet executing in an attempt to have such threads become part of one or more executing groups of threads for observation/measurement of L2 cache miss rates for the one or more executing groups of threads, thereby leading to a determination of the L2 cache miss rates of the individual threads in the one or more executing groups of threads.

Further, in one or more embodiments of the present invention, when an operating system scheduler has to assign a thread with an unknown L2 cache miss rate, that thread may be co-scheduled with a thread whose L2 cache miss rate is known. Accordingly, a measured L2 cache miss rate of these two threads executing concurrently allows for the determination of the L2 cache miss rate of the thread whose L2 cache miss rate was previously unknown. Moreover, in one or more embodiments of the present invention, assigning a thread having a known L2 cache miss rate with a thread having an unknown L2 cache miss rate may occur to a particular processing core of a chip multithreading processor.

Figure 10:
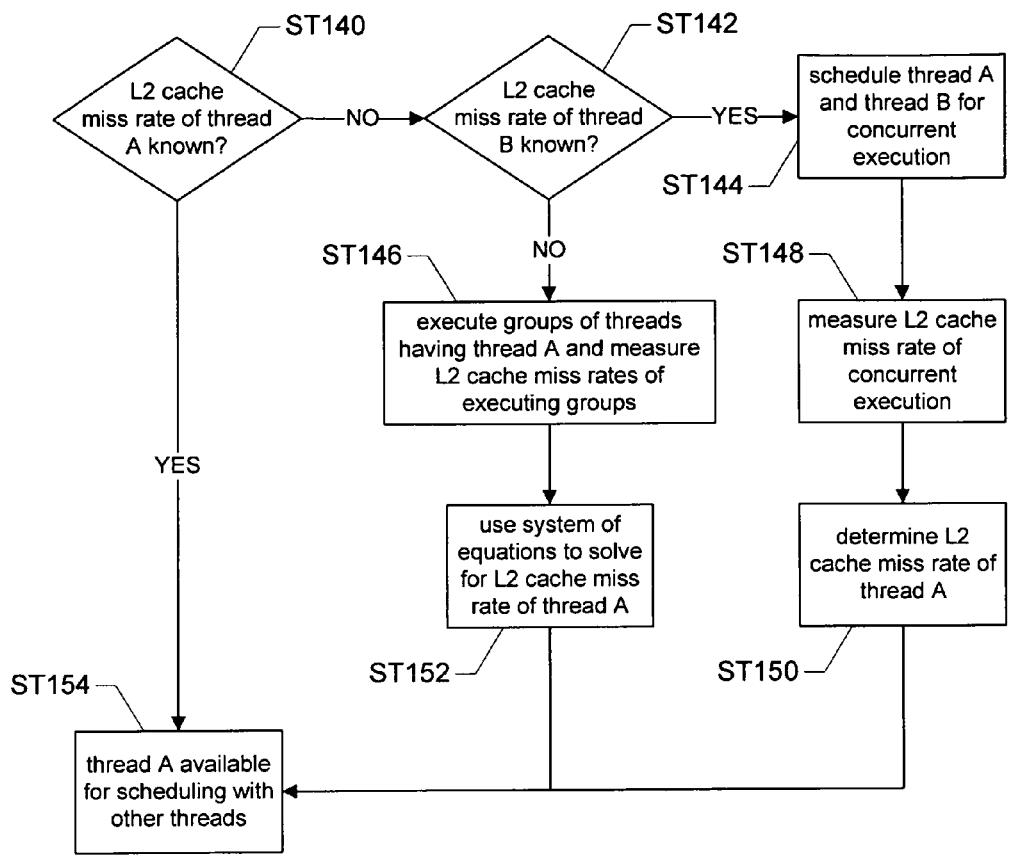
FIG. 10 shows a flow process in accordance with an embodiment of the present invention.

FIG. 10 shows an exemplary flow process in accordance with an embodiment of the present invention. When a thread A becomes available for scheduling, a determination is made as to whether an L2 cache miss rate for thread A is known ST140. If the L2 cache miss rate for thread A is known ST140, then thread A is available for scheduling with other threads ST154 in groups that, for example, achieve a relatively low L2 cache miss as is further described below.

However, if the L2 cache miss rate for thread A is unknown ST140, then a determination is made to whether an L2 cache miss rate for a thread B is known ST142. If the L2 cache miss rate for thread B is known ST142, then thread A and thread B are concurrently executed ST144, during which an L2 cache miss rate of the collective execution is measured ST148. Using the measured L2 cache miss rate in ST148, the L2 cache miss rate of thread A may be determined ST150, whereupon thread A is then available for scheduling with other threads ST154.

If, in step ST142, it is determined that the L2 cache miss rate of thread B is not known, then one or more groups of threads having thread A are executed and the L2 cache miss rates of the executing groups are measured ST146. Using a system of equations ST150 with the measured L2 cache miss rates in ST146, the L2 cache miss rate of thread A may be determined ST152, whereupon thread A is then available for scheduling with other threads ST154.

Those skilled in the art will note that once the L2 cache miss rates of n threads running in a system are determined, the L2 cache miss rate for any arbitrary subset of the n threads may be estimated by averaging the L2 cache miss rates of each of the threads in the subset.

Further, in one or more embodiments of the present invention, the determination of L2 cache miss rates of individual threads running in a system may be periodically or selectively re-measured. For example, if it is discovered that a measured L2 cache miss rate of a particular executing group of threads significantly deviates from an expected L2 cache miss rate for that group, then the L2 cache miss rates for the individual threads in the executing group of threads may be re-measured. Such re-measuring may involve, for example, co-scheduling a thread in the executing group of threads with another thread not part of the executing group of threads and having a known L2 cache miss rate that is not deemed to be in need of re-measuring.

Scheduling

As described above, in one or more embodiments of the present invention, groups of threads collectively having a relatively low L2 cache miss rate are scheduled together for execution. Assignment of a particular group of threads to a hardware context of a particular processing core may be based on a maximum L2 cache miss rate for an individual thread allowed for that hardware context. Thus, a to-be-assigned thread is assigned to a hardware context having the lowest maximum L2 cache miss rate for an individual thread allowed for that hardware context that is greater than the L2 cache miss rate of the to-be-assigned thread. For example, if a first hardware context has a maximum L2 cache miss rate of 3, and a second hardware context has a maximum L2 cache miss rate of 7, then (i) a thread having an L2 cache miss rate of 2 will be assigned to the first hardware context, and (ii) a thread having an L2 cache miss rate of 5 cannot be assigned to the first hardware context, but can be assigned to the second hardware context.

Figure 11:
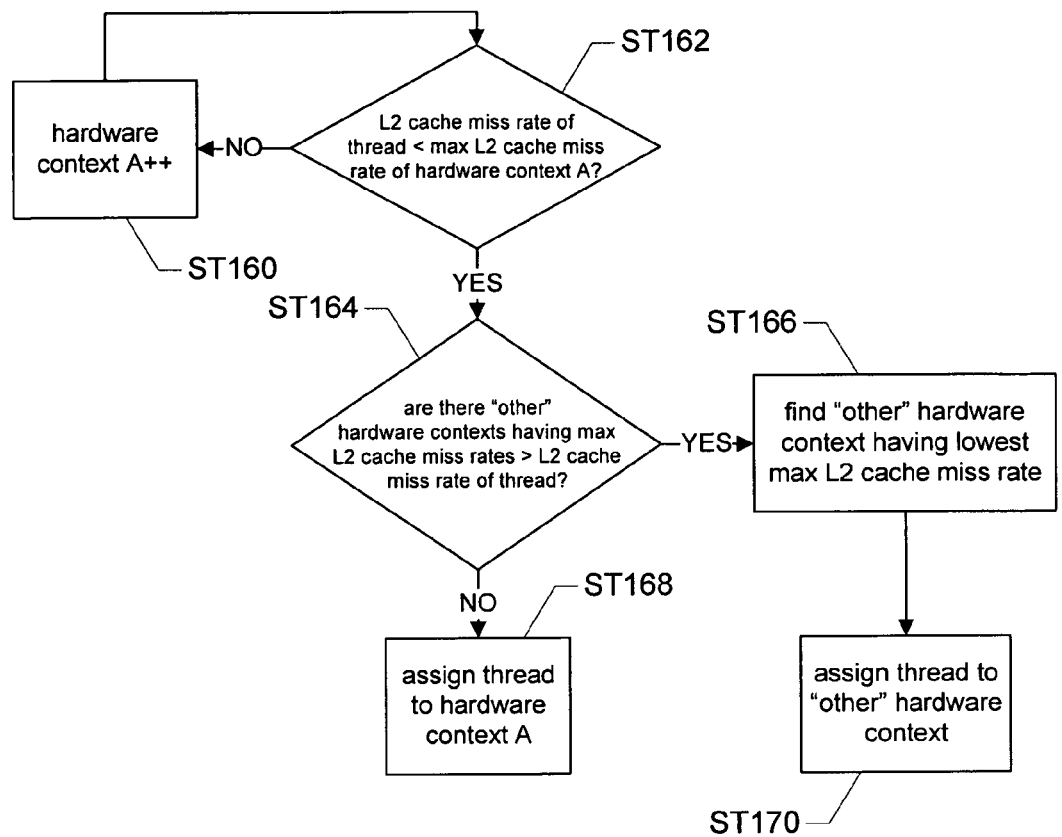
FIG. 11 shows a flow process in accordance with an embodiment of the present invention.

FIG. 11 shows an exemplary flow process in accordance with an embodiment of the present invention. When a thread is being scheduled, a determination is made as to whether an L2 cache miss rate of the thread is less than a maximum L2 cache miss rate value of a hardware context A ST162. If the L2 cache miss rate of the thread is not less than the maximum L2 cache miss rate value of the hardware context A ST162, then an L2 cache miss rate of a next hardware context A is compared against the L2 cache miss rate of the thread ST160, ST162.

If the L2 cache miss rate of the thread is less than a maximum L2 cache miss rate value of a hardware context A ST162, then a determination is to made as to whether there are "other" hardware contexts that have maximum L2 cache miss rate values greater than the L2 cache miss rate of the thread ST164. If there are no such "other" hardware contexts, then the thread is assigned to hardware context A ST168. Otherwise, the "other" hardware context having the lowest maximum L2 cache miss rate value greater than the L2 cache miss rate of the thread is found ST166, whereupon the thread is then assigned to that "other" hardware context ST170.

Figure 12:
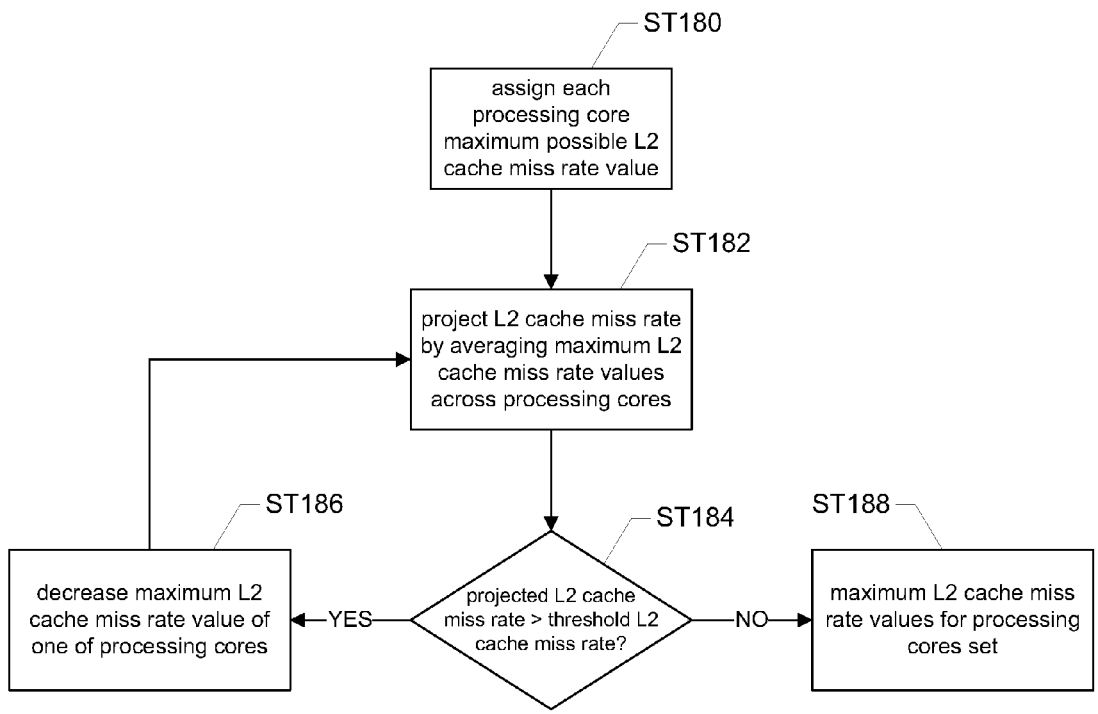
FIG. 12 shows a flow process in accordance with an embodiment of the present invention.

Assigning a maximum L2 cache miss rate value to a hardware context may be achieved in one of various ways. FIG. 12 shows an exemplary flow process for assigning maximum L2 cache miss rate values to hardware contexts in a chip multithreading processing in accordance with an embodiment of the present invention. In FIG. 12, each hardware context in a chip multithreading processor is first assigned its maximum possible L2 cache miss rate value ST180. Then, a projected L2 cache miss rate is computed by averaging the maximum L2 cache miss rate values across the hardware contexts ST182. If the projected L2 cache miss rate is higher than a threshold L2 cache miss rate ST184, the maximum L2 cache miss rate value of one of the hardware contexts is decreased ST186, whereupon ST182 is repeated. Once and if the projected L2 cache miss rate is less than or equal to the threshold L2 cache miss rate ST184, the maximum L2 cache miss rate values of the hardware contexts may be considered set ST188.

Those skilled in the art will note that in one or more embodiments of the present invention, the threshold L2 cache miss rate may be selected so as to effectuate a desired behavior or performance level. In one or more embodiments of the present invention, should the flow process shown in FIG. 12 fail to bring the projected L2 cache miss rate to be less than or equal to the threshold L2 cache miss rate, the flow process may be caused to terminate.

In one or more embodiments of the present invention, a hardware context that has its maximum L2 cache miss rate value decreased (e.g., in ST184 of FIG. 12) may be selected such that decreasing its maximum L2 cache miss rate value results in the least amount of threads being restricted from being assigned.

Those skilled in the art will note that by ensuring that a thread can be only assigned to particular hardware contexts in a chip multithreading processor, the assignment of "cache-greedy" threads (i.e., threads having relatively high L2 cache miss rates, thereby having poor "cache locality") may be restricted to one or only a few of all the hardware contexts. Thus, in general, the overall L2 cache miss rate for a system having n threads is reduced as "cache-greedy" threads of the n threads are not allowed to "clog" up numerous hardware contexts. In other words, by ensuring that "cache-greedy" threads are assigned to only one or a few of all hardware contexts in a chip multithreading processor, long latency times associated with such "cache-greedy" threads may be avoided in most of the hardware contexts.

Advantages of the present invention may include one or more of the following. In one or more embodiments of the present invention, a chip multithreading processor may assign threads for execution in a manner that improvedly uses a shared cache of the chip multithreading processor.

In one or more embodiments of the present invention, a chip multithreading processor may schedule threads such that cache-greedy threads are not allowed to cause long latency events in any one of the processing cores of the chip multithreading processor.

In one or more embodiments of the present invention, by scheduling threads of a chip multithreading processor dependent on their cache miss rates, an overall cache miss rate of the chip multithreading processor may be reduced.

In one or more embodiments of the present invention, a determination of cache miss rates of one or more threads may be determined without significant effect on the performance of a chip multithreading processor employing the one or more threads.

In one or more embodiments of the present invention, a scheduler of a chip multithreading processor may achieve reduced contention of a shared hardware resource (e.g., an L2 cache) of the chip multithreading processor.

In one or more embodiments of the present invention, by scheduling threads of a chip multithreading processor dependent on their L2 cache miss rates, instruction throughput may be increased.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of performing computer system operations, comprising:
   concurrently executing a first thread and a second thread, wherein the second thread comprises a known shared cache miss rate;
   measuring a combined shared cache miss rate of the first thread and the second thread;
   calculating a shared cache miss rate of the first thread based on the combined shared cache miss rate and the known shared cache miss rate;
   identifying, in a chip multithreading processor, a plurality of hardware contexts comprising a plurality of maximum shared cache miss rates, wherein the plurality of hardware contexts is located on a single processing core;
   identifying a minimum shared cache miss rate from the plurality of maximum shared cache miss rates, wherein each of the plurality of maximum shared cache miss rates exceeds the shared cache miss rate of the first thread;
   selecting a hardware context of the plurality of hardware contexts corresponding to the minimum shared cache miss rate; and
   assigning the first thread to the hardware context.

2. The method of claim 1, further comprising:
   calculating, prior to identifying the minimum shared cache miss rate, a projected shared cache miss rate by averaging at least the plurality of maximum shared cache miss rates; and
   decreasing, in response to the projected shared cache miss rate exceeding a threshold shared cache miss rate, a maximum shared cache miss rate of the plurality of maximum shared cache miss rates.

3. A computer-readable storage medium storing a plurality of instructions for performing computer operations, the plurality of instructions comprising functionality to:
   concurrently execute a first thread and a second thread, wherein the second thread comprises a known shared cache miss rate;
   measure a combined shared cache miss rate of the first thread and the second thread;
   calculate a shared cache miss rate of the first thread based on the combined shared cache miss rate and the known shared cache miss rate;
   identify, in a chip multithreading processor, a plurality of hardware contexts comprising a plurality of maximum shared cache miss rates, wherein the plurality of hardware contexts is located on a single processing core;
   identify a minimum shared cache miss rate of the plurality of maximum shared cache miss rates, wherein each of the plurality of maximum shared cache miss rates exceeds the shared cache miss rate of the first thread;
   select a hardware context of the plurality of hardware contexts corresponding to the minimum shared cache miss rate; and
   assign the first thread to the hardware context.

4. The computer-readable storage medium of claim 3, wherein the plurality of instructions further comprise functionality to:
   calculate, prior to identifying the minimum shared cache miss rate, a projected shared cache miss rate by averaging at least the plurality of maximum shared cache miss rates; and
   decrease, in response to the projected shared cache miss rate exceeding a threshold shared cache miss rate, a maximum shared cache miss rate of the plurality of maximum shared cache miss rates.

5. A computer system, comprising:
   a chip multithreading processor comprising a plurality of processing cores having a plurality of hardware contexts;
   a cache memory shared by the plurality of processing cores; and
   a memory comprising a plurality of instructions for performing computer operations, the plurality of instructions comprising functionality to:
   concurrently execute a first thread and a second thread, wherein the second thread comprises a known shared cache miss rate,
   measure a combined shared cache miss rate of the first thread and the second thread,
   calculate a shared cache miss rate of the first thread based on the combined shared cache miss rate and the known shared cache miss rate,
   identify a plurality of maximum shared cache miss rates corresponding to the plurality of hardware contexts, wherein the plurality of hardware contexts is located on a single processing core,
   identify a minimum shared cache miss rate of the plurality of maximum shared cache miss rates, wherein each of the plurality of maximum shared cache miss rates exceeds the shared cache miss rate of the first thread,
   select a hardware context of the plurality of hardware contexts corresponding to the minimum shared cache miss rate, and
   assign the first thread to the hardware context.

6. The computer system of claim 5, wherein the cache memory is a level two cache memory.

7. The system of claim 5, wherein the plurality of instructions further comprise functionality to:
   calculate, prior to identifying the minimum shared cache miss rate, a projected shared cache miss rate by averaging at least the plurality of maximum shared cache miss rates; and
   decrease, in response to the projected shared cache miss rate exceeding a threshold shared cache miss rate, a maximum shared cache miss rate of the plurality of maximum shared cache miss rates.

* * * * *